C. E. CARTER.
TARGET APPARATUS.
APPLICATION FILED SEPT. 14, 1915. RENEWED AUG. 9, 1918.
1,396,698.
Patented Nov. 8, 1921.
3 SHEETS—SHEET 1.
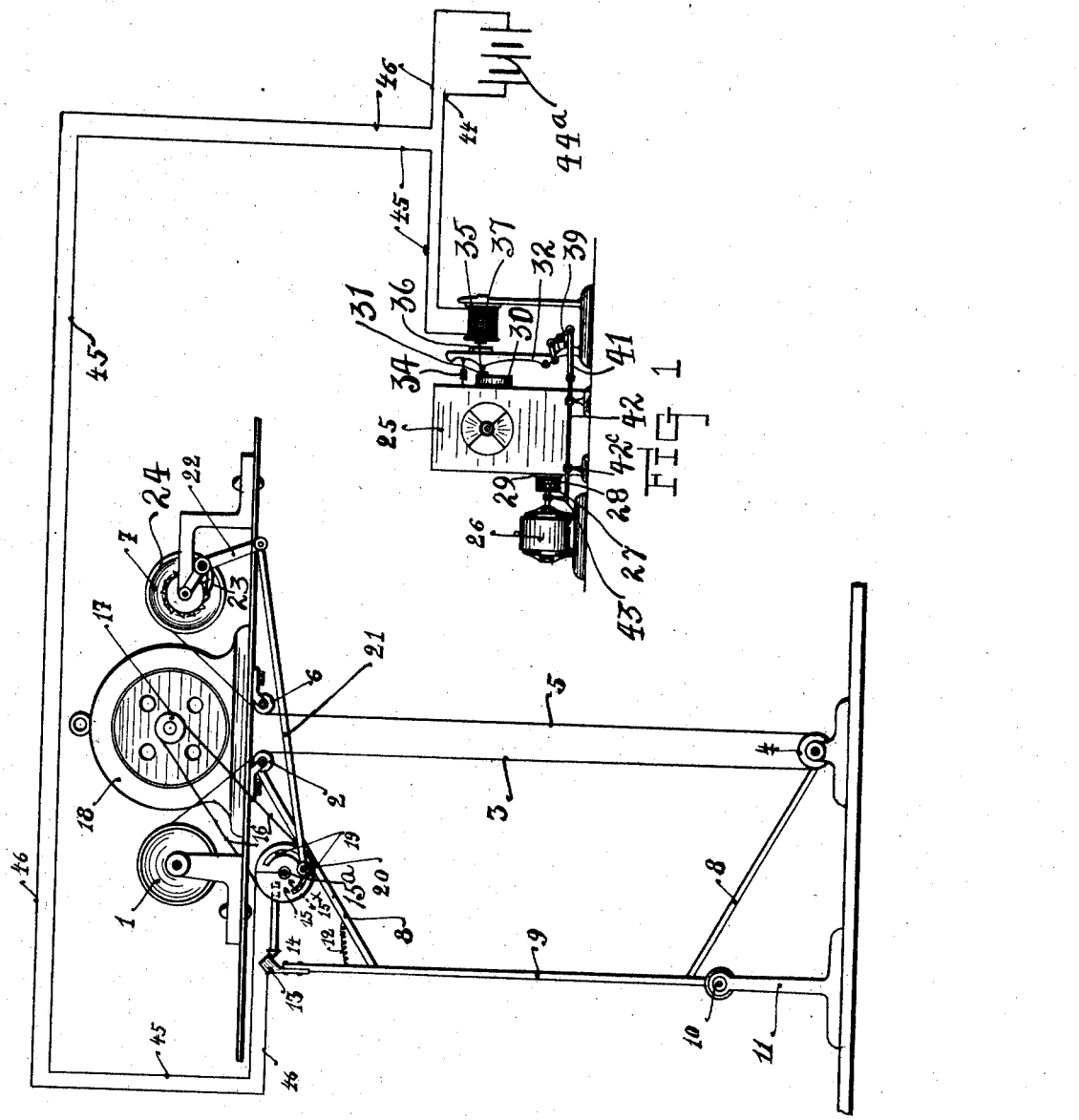

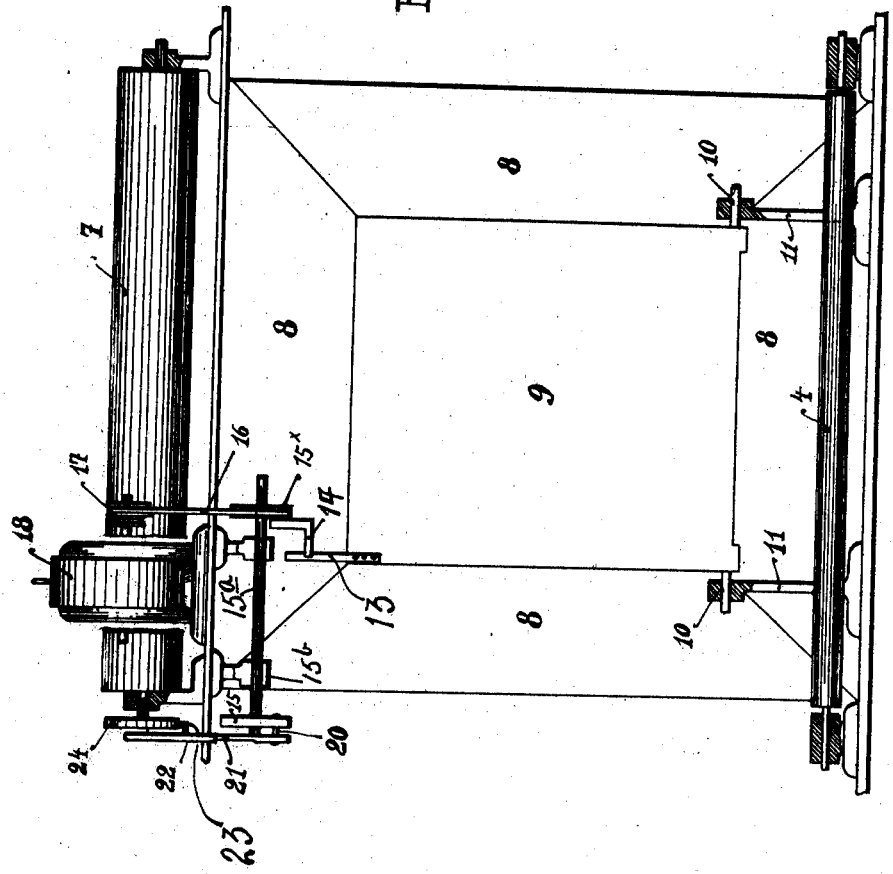

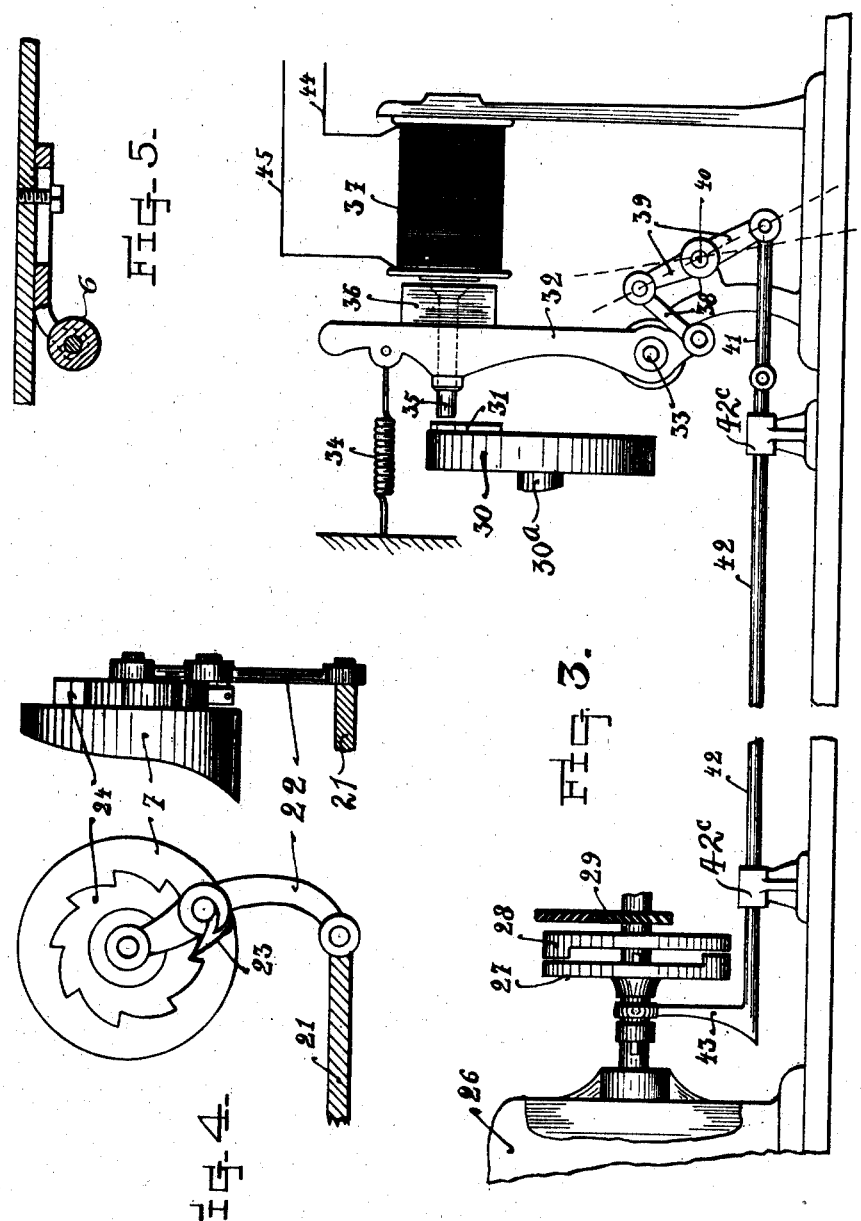

UNITED STATES PATENT OFFICE.

CLARK E. CARTER, OF MONTREAL, QUEBEC, CANADA, ASSIGNOR OF ONE-HALF TO ALLAN R. McBEATH, OF MONTREAL, CANADA.

TARGET APPARATUS.

1,396,698. Specification of Letters Patent. Patented Nov. 8, 1921.

Application filed September 14, 1915, Serial No. 50,636. Renewed August 9, 1918. Serial No. 249,185.

(GRANTED UNDER THE PROVISIONS OF THE ACT OF MARCH 3, 1921, 41 STAT. L., 1313.)

*To all whom it may concern:*

Be it known that I, CLARK E. CARTER, a subject of the King of Great Britain, and residing at Number 382 De St. Valier street, in the city of Montreal, Province of Quebec, Canada, have invented certain new and useful Improvements in Target Apparatus; and I do hereby declare that the following is a full, clear, and exact description of the invention, such as will enable others skilled in the art to which it appertains to make and use the same.

My invention relates to target apparatus, particularly to that type which have cinematographic targets and means for indicating the result of a shot.

One object of my invention is to provide means for stopping the movement of the cinematographic apparatus at the exact moment of the impact of the bullet, so that the particular image at which a shot is directed is left on the screen, in order that the accuracy of the marksman may be determined, instead of permitting several succeeding images to be projected before stopping as is the case with now known types of this class of invention. To this end it is to be noted that the cinematograph arresting means operates to stop the cam-shaft which is the actual film actuating means of the modern cinematographic machines.

A further object is to provide means when the apparatus is stopped to permit an inspection of the result of a shot, and to indicate the same, and, after an inspection, to automatically restart the mechanism and remove the indication of the result.

A further object is to provide an adjustable shot indicating screen, which will either indicate the result of the shot to the marksman by means of a narrow field of vision, or to a plurality of persons by a wide field of vision, varied in this invention by variation of the distance between the folds of a continuous, motor wound screen strip.

A further object is to provide a rockably pivoted target plate, arranged to be rocked by the impact of a bullet, and by such rocking to release a motor driven screen winding mechanism and also to open a circuit permitting the operation of mechanism to instantly stop the cinematograph itself and to throw out the clutch of the cinematograph actuating motor.

My invention consists of the construction, combination and arrangement of parts, as herein illustrated, described and claimed.

In the accompanying drawings, forming part of this application, I have illustrated a form of embodiment of my invention, in which drawings similar reference characters designate corresponding parts, and in which:

Figure 1 is a side elevation of the target and a front elevation of the projecting machine, the wiring being diagrammatically shown;

Fig. 2 is a front elevation of the target and its directly connected parts, the screen winding roll being broken away to show the motor;

Fig. 3 is a front elevation, of the motor showing its clutch and actuating means, and the arresting means for the projecting machine,—the machine itself being omitted;

Fig. 4 is a fragmentary detail in end-front elevation of the screen winding roll and its immediate actuating means for shifting the screen strip.

Fig. 5 is a detail view illustrating one of the adjustable rollers.

Referring to the drawings a free running roll 1 has wound thereon the screen strip 3, of any suitable material, which upon leaving the roll 1 passes over a guide roll 2 under a lower guide roll 4 and upward to form a second fold 5. The screen strip then passes over a third guide roll 6 to a screen winding roll 7. The rolls 2 and 6 are adjustable with relation to each other by means of the slot and bolt connections as better shown in Fig. 5 of the drawings, so as to vary the distance separating the two for the purpose of varying the field of the shot indicating means as hereinafter described. The winding roll 7 is normally at rest.

Behind the screen folds 3 and 5 are disposed a plurality of inclined bullet deflecting members 8 and a vertical wall 9, constructed of metal to stop the bullets fired at and passing through the screen. The vertical wall 9 is balanced and pivotally supported at the points 10 on standards 11, to permit a backward rocking movement under the impact of a bullet and a return forward movement under the tension of the coiled spring 12.

Carried by the upper part of the balanced wall 9 is a contact arm 13 arranged to normally abut a contact arm 14, secured on a rotatable disk 15$^x$ secured on shaft 15$^a$, rotatably disposed in bearings 15$^b$. A belt 16 is disposed around the disk 15$^x$ and the pulley 17 of a motor 18. The belt is so loosely arranged that normally the friction thereof is insufficient to overcome the pressure of the contact arm 13 on the contact 14 under the tension of the spring 12. The tension of the latter is so proportioned as to exactly counterbalance this friction and the weight of the wall 9, so that the latter is free to rock backward instantaneously upon the impact of a bullet.

The disk 15 is formed with an arcuate slot 19, in which is slidably disposed a plug 20. One end of a connecting rod 21 is secured to the plug 20 and its opposite end is pivotally connected to a lever 22, rockably disposed on the shaft of the screen winding roll 7. On the rockable lever 22 is pivoted spring pressed pawl 23, arranged to engage the teeth of a ratchet wheel 24 fixed on the end of the screen winding roll 7, so that movement of the rod forward (toward the right hand of Fig. 1) advances the pawl one tooth on the ratchet wheel 24.

The cinematographic apparatus 25 is of any suitable construction, having the usual cam-shaft of the late type of this class of apparatus, and is driven by a motor 26, through the medium of a clutch formed of members 27, 28, and gear wheels 29.

In improved types of cinematograph machines the cam shaft is the ultimate driving element nearest to the film reel, and my invention for stopping movement of the film is therefore connected with this shaft in order to effect the stopping of the machine at the exact moment a particular image is struck on the target to permit an inspection of the result on that particular image. That is to say the operation of the apparatus is so rapid that a stopping mechanism placed elsewhere would not act quick enough to be accurate. To this end a disk 30 is disposed on the cam-shaft 30$^a$ (Figs. 1 and 3) and is provided with a projecting lug 31. Arranged adjacent thereto is a lever 32, pivoted adjacent its lower end as at 33. The upper end of the lever 32 can be maintained in one position by means of a coiled spring 34, so that a pin 35 carried by the lever is in the path of movement of the lug 31 when the disk 30 is rotated.

On the side of the lever 32 opposite the pin 35 is fixed the armature 36 of an electromagnet 37. The lower end of the lever 32 is connected by a link 38 to the upper end of a second lever 39, which is pivoted as at 40 to a suitable standard. The lower end of the lever 39 is pivotally connected to one end of a rod 41, the opposite end of which is pivotally connected to a slidably supported rod 42, which extends to a point adjacent the end of motor 26 and which is slidably supported in the bearings 42$^c$. An arm 43 is carried by the rod 42 and is arranged to slide the movable member 27 into and out of engagement with the fixed member 28, forming the clutch controlling the gears 29, which drive the cinematograph apparatus 25.

A wire 44 conducts a current from a suitable source of electricity 44$^a$ to the coil 37 of an electromagnet, and from there the current is carried through the wire 45 to the disk 15$^x$. The other pole of the source of electricity 44$^a$ is connected by the wire 46 to the contact arm 13, to complete a circuit.

The motors 18 and 26 are run from independent circuits and form no part in detail of the invention and being of a common type have not been illustrated in the drawings.

The operation of the invention is as follows: With the parts as shown, the motors 18 and 26 in rotation, the electric circuit closed, the motor clutch 27, 28 thrown in, the friction of the belt 16 is not sufficient to rotate the disk 15 to break the contact. The changing picture from the cinematograph is thrown on the screen fold 5, as the pin 35 is retracted out of the path of movement of the lug 31, under the action of the armature 36 of the electromagnet 37.

A bullet fired at the picture on the screen passes through both of its folds and its impact against the rockably pivoted balanced wall 9, overcoming its inertia forces it backward (or to the left hand of Fig. 1). The movement actuates the contact arm 13 away from the contact 14 and breaks the circuit. The first effect is to deënergize the magnet 37 and to permit rocking of the lever 32, under tension of spring 34 toward the left hand of Figs. 1 and 3. The first step of this rocking movement of the lever is to throw the pin 35 into the path of movement of the shoulder 31 on the disk 30, which is on the cam-shaft 30$^a$ of the cinematographic machine 25 and makes one revolution for each image projected. The necessity for a positive stop of this kind has been shown from experiments with various forms of mechanism for the purpose, including means for simply stopping the motor, placing brakes on other spindles of the machine, and gradually applied friction brakes. All of these permit more than one revolution of the cam shaft, (or similar shafts in earlier types of machines) so that the image actually struck is replaced by another before the film stops. This effect is instantaneous in my invention and the actual image struck remains perforated on the screen fold 5. The second step of the rocking effect is to throw out the clutch 27, 28 through its connecting mechanism and thus stop the cinematographic actuating means, simultaneously with the stopping of its reel.

The second effect of breaking the circuit is mechanical, as the contact is broken, the friction of the belt 16 is sufficient to rotate the disk 15 to actuate the rod 21 forward and retract it, to wind the screen the distance from one tooth to another on the ratchet 24.

In the meantime light from any suitable source directed from behind the screen strip passes through the openings formed by the passage of the bullet through the folds 3 and 5, permitting the rays to pass therethrough indicating the exact spot struck by the bullet. If the folds 3 and 5 are arranged very close together the field of these rays is wide and they are visible to a number of observers, which is highly desirable in class instruction in target shooting. If the folds 3 and 5 are widely separated the field is narrowed so that the rays through the bullet perforations are visible only to an observer located in the exact plane of the marksman when the shot was fired, thus eliminating observers and comment when individual target instruction is being practised.

In either event the effect of the shot is visible until movement of the screen winding roll moves the screen so that the holes through the folds 3 and 5 do not register. As this movement is completed the contact arm is returned to the position shown in Fig. 1, the wall 9 having been rocked forward under the tension of the spring 12, the circuit is again closed. This energizes the magnet 37, retracts the pin 35, throws in the clutch 27, 28, and the cinematograph automatically recommences the projection of a moving target on the fold 5 of the screen.

Having thus fully described my invention, what I claim as new and desire to secure by Letters Patent is:

1. In combination with a cinematographic machine means for operating the machine, a screen arranged to receive a projection of images from the machine, a movable wall arranged behind the screen and balanced to have a rockable movement, a screen winding means and rotary means adapted to be rendered operative by the rocking of the wall to cause the screen winding means to be brought into operation.

2. In combination with a cinematographic machine means for actuating the machine, means for rendering the machine inoperative, a screen, a wall arranged behind the screen, an intermittently motor driven disk having an arcuate slot, a plug disposed to slide in the slot, a rod connected to the plug, a lever connected with the rod, a pawl pivoted on said lever, a ratchet wheel disposed in the path of the pawl, a screen winding roll to which the ratchet wheel is connected, and means coacting with the wall to limit the movement of the disk.

3. In combination with a cinematographic machine means for actuating the machine, a screen, a wall arranged behind the screen, an intermittently motor driven disk, a screen winding roll, means for operatively connecting said roll to said disk, means for rendering the machine inoperative, an electric switch included in said means for rendering the machine operative, one terminal of said switch being carried by said wall, an arm projecting from said disk, and having a terminal of the switch arranged thereon, and said disk being adapted to rotate when said switch is broken whereby the screen winding roll will be moved for the purpose set forth.

4. The combination with a cinematographic machine, means for actuating the machine to project a succession of images, a screen arranged to receive the images, a wall movably arranged behind the screen, a rotary switch member and means whereby when said wall is moved said rotary switch member will be caused to revolve and the machine stopped.

5. The combination with a cinematographic machine adapted to project a succession of images, a screen arranged to receive the images, a movable member behind said screen, a rotary member adapted to contact with said movable member, and means whereby when a particular image is perforated the movable member will be moved and the rotary member will be released for causing the machine to be prevented from operation and the screen caused to be wound.

6. The combination with a cinematographic machine, means for actuating the machine to project a succession of images, a screen arranged to receive the images, a movable member, a rotary member, said movable member adapted to prevent the rotation of said rotary member and means whereby upon each revolution of said rotary member the machine will be arrested and the screen caused to move.

7. The combination with a cinematographic machine means for actuating the machine to project a succession of images, a screen arranged to receive the images, a movable wall, means for arresting the machine instantly when a particular image is perforated, an electric circuit included in said means, a switch terminal carried by said wall, a rotary switch member adapted to contact therewith to close the circuit whereby the machine will be brought into operation and means associated with said rotary member whereby the screen will be moved a slight distance during each complete revolution of said rotary member.

8. The combination with a cinematographic machine means for actuating the machine to project a succession of images, a screen arranged to receive the images, a wall, means for pivotally connecting one end of the wall, means for arresting the machine instantly when a particular image is perforated, an electric circuit included in said means, a switch terminal carried by the free end of said wall, a movable switch terminal, a rotary member adapted to actuate said movable switch member whereby the circuit may be opened or closed for causing the machine to be brought into and out of operation substantially as and for the purpose set forth.

9. The combination with a cinematographic machine means for actuating the machine to project a succession of images, a vertical wall, means for pivotally supporting the lower end of said wall, a coiled spring for normally holding said wall in a vertical position, a screen arranged to receive the images, means for arresting the machine, an electric circuit included in said means, a switch terminal carried by the upper end of said wall, and a movable switch terminal adapted to contact therewith to close the circuit whereby the machine will be brought into operation.

10. In a shooting gallery the combination comprising a motor driven cinematographic machine for projecting images, a screen for receiving said images, means for winding the screen, a movable wall disposed behind the screen, means for arresting the machine, a continuously driven motor, a rotary member operatively connected to said motor, said rotary member being prevented against rotation when said machine is being operated, and means whereby when said wall is moved the rotary member will be permitted to rotate whereby said screen winding means will be brought into operation.

11. In combination with a cinematographic machine, a motor for actuating the machine, a clutch for operatively connecting the motor with the machine, a cam shaft carried by the machine, a screen arranged to receive projections from the machine, a wall movably arranged behind the screen, means coöperating with the wall to cause the clutch to operate and means adapted to act positively upon the cam shaft of the machine to arrest the movement of the machine for the purpose set forth.

12. In combination with a cinematographic machine a motor for driving the machine, a clutch for operatively connecting the motor with the machine, a disk on the machine, a spring pressed lever adapted to positively engage said disk, means for operatively connecting the lever with said clutch actuating means for holding said lever out of contact with said disk and causing the clutch to be brought into operation, a movable wall and means whereby upon moving of said wall the lever will be released and the clutch thrown out of operation.

13. In combination with a cinematographic machine, a film controlling means, means for actuating the machine, a screen arranged to receive projections from the machine, a wall movably arranged behind the screen, machine arresting means, means for throwing out of action the machine actuating means including a clutch, a spring pressed member, connecting levers and rods interposed between the spring pressed member and the clutch, an electro-magnet arranged to actuate the spring pressed member against the tension of its spring for positively stopping the film controlling means and a circuit from the electro-magnet to the movable wall.

14. In combination with a cinematographic machine having a cam shaft, means for actuating the machine, means for operatively connecting the actuating means with the cam shaft, a screen arranged to receive projections from the machine, a wall movably arranged behind the screen, means coöperating with the wall for engaging said cam shaft and disconnecting said actuating means with the machine for arresting the movement of the machine, said means coöperating with the wall including a projecting member rotatable with the cam shaft, a spring pressed member arranged adjacent the path of movement of the projecting member, an electro-magnet arranged to actuate the spring pressed member in one direction, an electric circuit from the electro-magnet to the wall and a contact on the wall for completing the circuit.

15. In combination with a cinematographic machine, means for operating the machine, a screen provided with a plurality of folds disposed in front of the machine, and means for varying the distance between the folds.

16. In combination with a cinematographic machine means for operating the machine, a screen provided with a plurality of folds disposed in front of the machine, means for varying the distance between the folds and means for intermittently winding the screen to move one of the folds with relation to the other.

17. In combination with a cinematographic machine means for operating the machine, a single strip screen arranged in folds one covering the other, means for varying the distance between the folds, and motor driven means for shifting the folds with relation to each other.

18. In a target a roll, a screen strip arranged on the roll, a plurality of guide rolls over which the strip is disposed to form folds, and means for adjusting some of the guide rolls to vary the distance between the folds.

19. A cinematograph target apparatus embodying therein a screen, a projector adapted to direct moving images upon said screen, a back plate or shield movable under the impact of a bullet therewith arranged rearwardly of said screen, means whereby said projector is stopped to change said moving image to a still image substantially simultaneously with the impact of a bullet with said screen, operative connection between said back plate or shield and said means, and automatically acting means whereby said projector is again made operative to direct moving images upon said screen after the lapse of a brief interval and said back plate or shield is substantially simultaneously restored to normal.

In witness whereof I have hereunto set my hand in the presence of two witnesses.

CLARK E. CARTER.

Witnesses:
N. HEPWORTH,
C. G. MARKELL.